(12) United States Patent
Gerö et al.

(10) Patent No.: US 10,243,759 B2
(45) Date of Patent: Mar. 26, 2019

(54) AUTO-DISCOVERY OF PACKET ISLANDS OVER GMPLS-UNI

(71) Applicant: Telefonaktiebolaget LM Ericsson (publ), Stockholm (SE)

(72) Inventors: Balázs Peter Gerö, Budapest (HU); Daniele Ceccarelli, Sollentuna (SE); András Kern, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 15/502,644

(22) PCT Filed: Sep. 3, 2014

(86) PCT No.: PCT/EP2014/068769
§ 371 (c)(1),
(2) Date: Feb. 8, 2017

(87) PCT Pub. No.: WO2016/034226
PCT Pub. Date: Mar. 10, 2016

(65) Prior Publication Data
US 2017/0237582 A1    Aug. 17, 2017

(51) Int. Cl.
*H04L 12/46*    (2006.01)
*H04L 12/751*    (2013.01)
(Continued)

(52) U.S. Cl.
CPC ...... *H04L 12/4604* (2013.01); *H04L 12/4633* (2013.01); *H04L 41/04* (2013.01);
(Continued)

(58) Field of Classification Search
CPC . H04L 12/4604; H04L 12/4633; H04L 45/02; H04L 45/04; H04L 41/0893;
(Continued)

(56) References Cited

U.S. PATENT DOCUMENTS 7,710,872 B2 *   5/2010   Vasseur ................. H04L 45/50
                                                              370/230
8,155,000 B2 *   4/2012   Vasseur ................. H04L 45/50
                                                              370/230

(Continued)

OTHER PUBLICATIONS

Farrel et al. "Problem Statement and Architecture for Information Exchange Between Interconnected Traffic Engineered Networks"; Network Working Group; Internet-Draft; Jul. 25, 2014; pp. 1-55.
(Continued)

*Primary Examiner* — Man U Phan
(74) *Attorney, Agent, or Firm* — Sage Patent Group

(57) ABSTRACT

The present disclosure generally relates to the support of optical connection setup. More specifically, the present disclosure relates to a technique of supporting provision of a connection via a data communication network of an optical network between packet network islands. A method embodiment comprises establishing a Border Gateway Protocol-Link State, BGP-LS, connection via the DCN between a first edge node of the first packet network island and a BGP-LS node in the optical network.

27 Claims, 8 Drawing Sheets

(51) Int. Cl.
*H04L 12/715* (2013.01)
*H04L 12/24* (2006.01)
*H04Q 11/00* (2006.01)

(52) U.S. Cl.
CPC .......... *H04L 41/0893* (2013.01); *H04L 45/02* (2013.01); *H04L 45/04* (2013.01); *H04Q 11/0066* (2013.01); *H04Q 11/0067* (2013.01); *H04L 41/5096* (2013.01); *H04Q 2011/0077* (2013.01)

(58) Field of Classification Search
CPC ................ H04L 41/04; H04Q 11/0066; H04Q 11/0067; H04Q 2011/0077
USPC .................................. 370/351–389, 392–401
See application file for complete search history.

(56) References Cited

U.S. PATENT DOCUMENTS

| | | | | |
|---|---|---|---|---|
| 8,830,989 | B2* | 9/2014 | Spraggs | H04J 14/0267 370/352 |
| 8,902,909 | B2* | 12/2014 | Wang | H04Q 11/0062 370/352 |
| 9,253,041 | B2* | 2/2016 | Previdi | H04L 41/12 |
| 9,590,850 | B2* | 3/2017 | Filsfils | H04L 41/0813 |
| 9,634,924 | B2* | 4/2017 | Filsfils | H04L 45/22 |
| 9,660,897 | B1* | 5/2017 | Gredler | H04L 45/50 |
| 9,912,577 | B2* | 3/2018 | Filsfils | H04L 45/04 |
| 2007/0133406 | A1 | 6/2007 | Vasseur | |
| 2008/0205293 | A1* | 8/2008 | Mitra | H04L 41/0806 370/254 |
| 2013/0232193 | A1* | 9/2013 | Ali | H04L 67/42 709/203 |

OTHER PUBLICATIONS

Dong et al. "BGP Extensions for Inter-AS Traffic Engineering (TE) Link Distribution"; Network Working Group; Internet-Draft; Jun. 30, 2014; pp. 1-6.

Gredler et al. "North-Bound Distribution of Link-State and RE Information using BGP"; Inter-Domain Routing; Internet-Draft; May 21, 2014; pp. 1-38.

Gredler et al. "North-Bound Distribution of Link-State and TE Information using BGP"; Inter-Domain Routing; Internet-Draft; Nov. 18, 2013; pp. 1-41.

Swallow et al. "Generalized Multiprotocol Label Switching (GMPLS) User-Network Interface (UNI): Resource ReserVation Protocol-Traffic Engineering (RSVP-TE) Support for the Overlay Model"; Networking Working Group; Request for Comments: 4208; Oct. 2005; pp. 1-13.

Li et al. "IS-IS Extensions for Traffic Engineering"; Network Working Group; Request for Comments: 5305; Oct. 2008; pp. 1-17.

* cited by examiner

AUTO-DISCOVERY OF PACKET ISLANDS OVER GMPLS-UNI

TECHNICAL FIELD

The present disclosure generally relates to the support of optical connection setup. More specifically, the present disclosure relates to a technique of supporting provision of a connection via a data communication network of an optical network between packet network islands.

BACKGROUND

Currently, there are two existing solutions to connect a client layer Network Management System (NMS) to a remote packet network island which are separated by an optical network.

In a first solution, an out-of-band data communication network (DCN) is needed to let the NMS possess enough information about a remote edge node, in order to initiate the setup of an optical connection, e.g. between an edge node to which the NMS is connected and the remote edge node of the remote packet network island. In this respect, "out-of-band" may relate to the fact that the DCN might not share physical links with the optical network via which communication may be enabled. According to this solution an out-of-band data communication network is required. The out-of-band DCN requires a complete network to be maintained in parallel, at least temporarily at times when there is no optical connection between the edge node and the remote edge node.

In a second solution, the edge nodes are connected by means of an in-band DCN connection over an already established optical connection. The already established optical connection keeps the client layer NMS connected to one or more packet network islands. According to this solution only an already established optical connection can be used.

SUMMARY

Accordingly, there is a need for an improved technique for supporting provision of a connection between two packet network islands.

According to a first aspect, a method of supporting provision of a connection via a data communication network (DCN) of an optical network between a first packet network island and a second packet network island is provided. The method comprises establishing a Border Gateway Protocol-Link State (BGP-LS) connection via the DCN between a first edge node of the first packet network island and a BGP-LS node in the optical network.

The first packet network island and the second packet network island may be part of one network, for example belong to the same client. One of the packet network islands may be a local packet network island and the other of the packet network islands may be a remote packet network island. There may be more than one remote packet network island. In this respect, the term "local" may identify the location of the packet network island where a client layer management system such as a client layer Network Management System (NMS) is located. In consequence, the local packet network island may be connected to such client layer management system. Likewise, the term "remote" may identify the location of the packet network island where a client layer management system such as a client layer Network Management System (NMS) is not located. In consequence, the remote packet network island may be separated from such client layer management system by the optical network.

The first packet network island and the second packet network island may be connected with the optical network by means of a Generalized Multiprotocol Label Switching User-to-Network Interface (GMPLS UNI), respectively.

The method may comprise establishing a BGP-LS connection via the DCN between a second edge node of the second packet network island and the BGP-LS node in the optical network.

The step of establishing the BGP-LS connection via the DCN between the first edge node of the first packet network island and the BGP-LS node in the optical network may comprise: configuring, in the first edge node, the Internet Protocol (IP) address of the BGP-LS node in the optical network; configuring, in the BGP-LS node in the optical network, the IP address of the GMPLS UNI in the first edge node as the IP address of a BGP-LS neighbour; and providing, by the DCN, a connection between the first edge node and the BGP-LS node in the optical network. If needed, the step of establishing a BGP-LS connection via the DCN between the second edge node of the second packet network island and the BGP-LS node in the optical network may comprise similar steps.

In case of a routed DCN, the connection provided by the DCN may be based on a Generic Routing Encapsulation (GRE) tunnel. The BGP-LS node may be co-located with a core node or a controller in the optical network.

The method may comprise distributing, via the established BGP-LS connection, link Network Layer Reachability Information, NLRI. The step of distributing the link NLRI may be subject to policy configuration in the BGP-LS node in the optical network.

Each link NLRI may comprise router identification (ID) of one of the first and second edge node in a local node descriptors field. The link NLRI may further comprise IP address of the GMPLS UNI in the one of the first and second edge node in a link descriptors field.

The distributing step may further comprise extending the link NLRI to carry a reference to the IP address of the GMPLS UNI in the one of the first and second edge node. The reference may be a predetermined value in the protocol ID field of the link NLRI.

At least one of the first and second packet network islands may further comprise a Network Management System (NMS) or Service-Defined-Networking (SDN) controller. The NMS or SDN controller may be configured to recognize the predetermined value and bind the IP address to the router ID comprised in the link NLRI. The NMS or SDN controller may be configured to store the binding of the IP address and the router ID comprised in the link NLRI.

The method may be performed in an edge node in one of the two packet network islands. In this case, the establishing step may comprise establishing the BGP-LS connection via the DCN with a BGP-LS node in the optical network.

The method may be performed in a BGP-LS node in the optical network. In this case, the establishing step may comprise establishing the BGP-LS connection via the DCN with an edge node in one of the two packet network islands.

The DCN may be a Data Connection Network as specified by the International Telecommunication Union (ITU). In this case, the DCN may be referred to as an ITU Data Connection Network.

According to a second aspect, a computer program is provided. The computer program comprises program code portions for performing the steps of any one of the method aspects described herein, when the computer program is run on one or more computing devices. The computer program may be stored on a computer readable recording medium to form a computer program product.

According to a third aspect, an edge node for supporting provision of a connection via a data communication network (DCN) of an optical network between two packet network islands is provided. The edge node comprises an establishing component configured to establish a Border Gateway Protocol-Link State (BGP-LS) connection via the DCN with a BGP-LS node in the optical network.

The edge node may be in one of the two packet network islands. There may also be an edge node in each of the two packet network islands. There may be one or more further packet network islands in addition to the two packet network islands.

Each of the two packet network islands may be connected with the optical network by means of a Generalized Multi-protocol Label Switching User-to-Network Interface (GMPLS UNI).

The edge node may comprise a configuring component and a connecting component. The configuring component may be configured to configure the Internet Protocol (IP) address of the BGP-LS node in the optical network. The connecting component may be configured to connect the edge node with the BGP-LS node in the optical network via a connection provided by the DCN, when, in the BGP-LS node in the optical network, the IP address of the GMPLS UNI in the edge node is configured as the IP address of a BGP-LS neighbour.

In case of a routed DCN, the connection provided by the DCN may be based on a Generic Routing Encapsulation (GRE) tunnel.

The edge node may comprise a distributing component. The distributing component may be configured to distribute, via the established BGP-LS connection, link Network Layer Reachability Information (NLRI). Distributing the link NLRI may be subject to policy configuration in the BGP-LS node in the optical network.

The link NLRI may comprise router ID of the edge node in the local node descriptors field. The link NLRI may further comprise the IP address of the GMPLS UNI in the edge node in the link descriptors field.

The edge node may further comprise an extending component. The extending component may be configured to extend the link NLRI to carry a reference to the IP address of the GMPLS UNI in the edge node. The reference may be a predetermined value in the protocol ID field of the link NLRI.

According to a fourth aspect, an NMS or SDN controller for recognising link NLRI distributed via a BGP-LS connection established by an edge node as described hereinbefore is provided.

The NMS or SDN controller may be configured to recognize a predetermined value in the protocol ID field of the link NLRI. The predetermined value may indicate a reference to the IP address of a GMPLS UNI in the edge node. The NMS or SDN controller may be configured to bind the IP address to a router ID comprised in the link NLRI. The NMS or SDN controller may be configured to store the binding of the IP address and the router ID comprised in the link NLRI.

According to a fifth aspect, a BGP-LS node in the optical network for supporting provision of a connection via a data communication network (DCN) of an optical network between two packet network islands is provided. The BGP-LS node comprises an establishing component. The establishing component is configured to establish a Border Gateway Protocol-Link State (BGP-LS) connection via the DCN with an edge node.

The edge node may be in one of the two packet network islands. There may also be an edge node in each of the two packet network islands.

The BGP-LS node may comprise a configuring component and a connecting component. The configuring component may be configured to configure the Internet Protocol (IP) address of a GMPLS UNI in the edge node as the IP address of a BGP-LS neighbour. The connecting component may be configured to connect the BGP-LS node in the optical network with the edge node via a connection provided by the DCN.

The devices of the third to fifth aspects may be configured to perform the steps of any one of the method aspects as described herein. In general, the steps of any one of the method aspects described herein may equally be embodied in one or more suitable components, devices or units, e.g. in suitable components of the edge node, the NMS or SDN controller and/or the BGP-LS node.

BRIEF DESCRIPTION OF THE DRAWINGS

In the following, the present disclosure will further be described with reference to exemplary embodiments illustrated in the figures, in which.

DETAILED DESCRIPTION

In the following description, for purposes of explanation and not limitation, specific details are set forth, such as specific network architectures, in order to provide a thorough understanding of the present disclosure. It will be apparent to one skilled in the art that the present disclosure may be practiced in other embodiments that depart from these specific details. For example, although the present disclosure is described with reference to a general data communication network, the present disclosure may be practiced with specific data communication networks such as a Data Connection Network as specified by the ITU. Further, for example, the present disclosure is applicable to any wireless networks such as Global System for Mobile Communications (GSM), Universal Mobile Telecommunications System (UMTS), Long Term Evolution (LTE), LTE-Advanced (LTE-A) networks, or to Wireless Local Area Network (WLAN) or similar wireless networks, but also to wireline networks such as, for example, the Intranet of a company with some or many separated subsidiaries or the Internet.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the present disclosure may also be embodied in a computer program product as well as in a system comprising a computer processor and memory coupled to the processor, wherein the memory is encoded with one or more programs that may perform the services, functions, steps and implement the components and devices disclosed herein.

Figure 1:
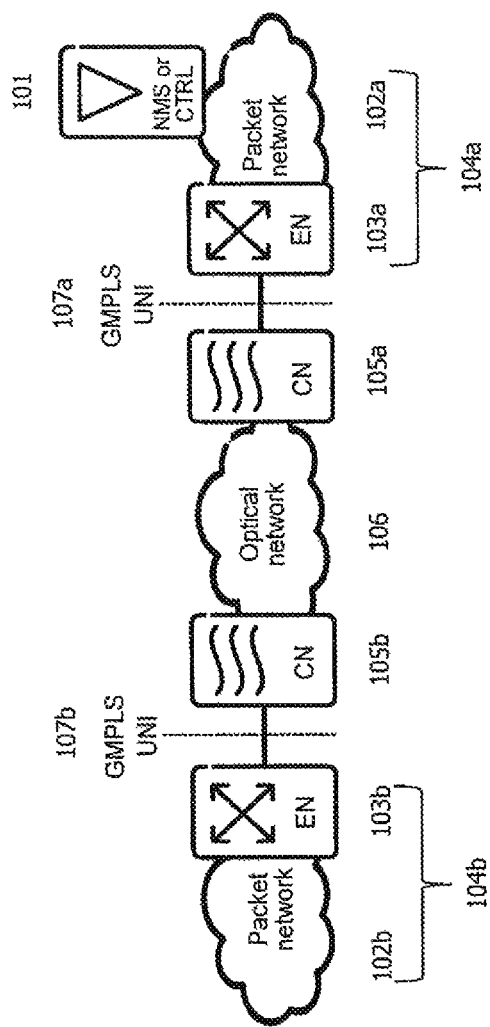
FIG. 1 schematically illustrates a prior art solution to provide a connection via a data communication network of an optical network between packet network islands.

FIG. 1 schematically illustrates a basic structure of a communication network 100. In the communication network 100, a Network Management System (NMS) 101 is connected to a packet network 102a. As illustrated in FIG. 1, a controller CTRL 101 may be connected to the packet network 102a instead of the NMS 101. The packet network 102a and an edge node (EN) 103a form a packet network island 104a. Further, in the communication network 100, a packet network 102b and an EN 103b form a packet network island 104b. An optical network 106 with two core nodes (CNs) (CN 105a and CN 105b) is arranged between the ENs 103a, 103b. The packet network islands 104a, 104b are connected with the optical network 106 by means of a Generalized Multiprotocol Label Switching User-to-Network Interface (GMPLS UNI), respectively, namely GMPLS UNI 107a and GMPLS UNI 107b.

According to a first approach which can be realized in the communication network 100 illustrated in FIG. 1, IP addresses of the GMPLS UNI 107a in EN 103b may be learnt from the optical network 106, e.g. by means of auto-configuration during provisioning of the UNI. However, the NMS 101 does not know which node is connected to the other side of the optical network 206, i.e., the side of packet network island 104b. In short, the NMS 101 does not know (the identity of the) EN 103b. In accordance with this approach, the NMS 101 requires an out-of-band data communication network (DCN) to let the NMS 101 possess enough information about EN 103b. Without such out-of-band DCN, setup of an optical connection, e.g. between EN 103a and EN 103b, cannot always be initiated. The out-of-band DCN, however, requires a complete network to be maintained in parallel, at least temporarily at times when there is no optical connection between EN 103a and EN 103b.

Figure 2:
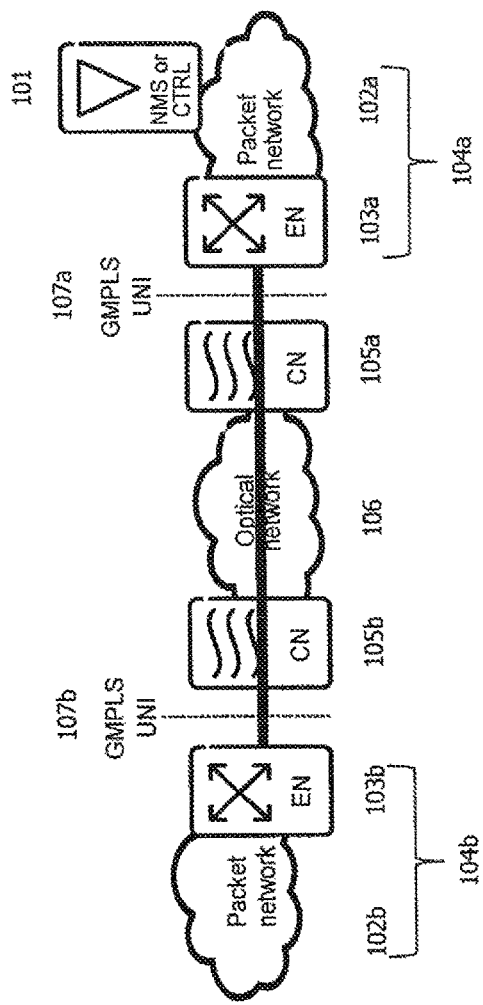
FIG. 2 schematically illustrates another prior art solution to provide a connection via a data communication network of an optical network between packet network islands.

FIG. 2 illustrates a second approach which can be realized in the communication network 100 of FIG. 1. According to this second approach, EN 103a and EN 103b are connected by means of an in-band DCN connection over an already established optical connection. In this way, the NMS 101 is kept connected to the packet network islands 104a, 104b. However, the second approach requires an already established optical connection.

Figure 3:
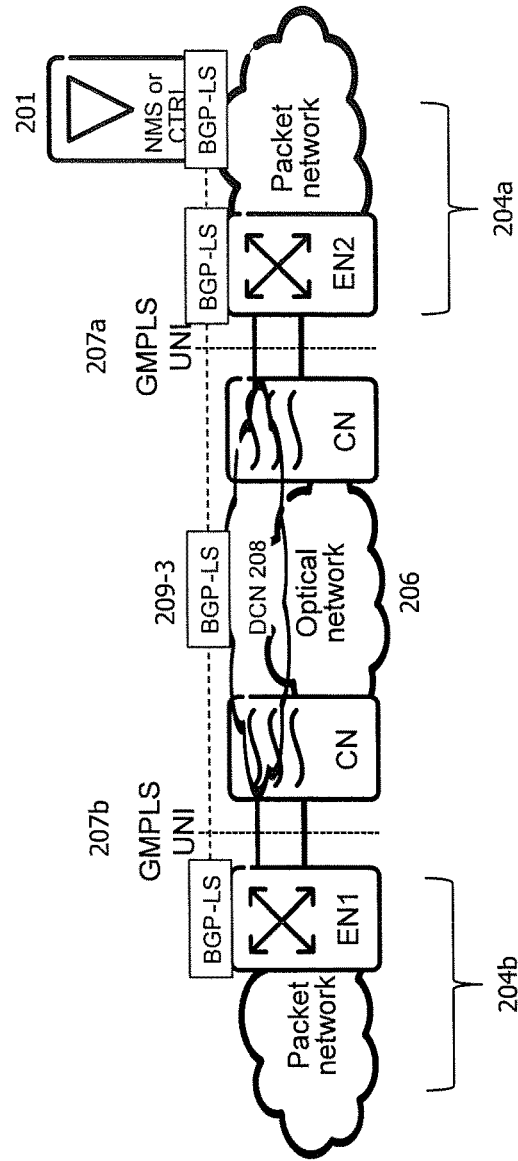
FIG. 3 schematically illustrates a GMPLS controlled optical network with two packet network islands.

FIG. 3 illustrates a communication network 200. In the communication network 200, a Network Management System NMS 201 according to a device embodiment is connected to a packet network island 204a. The packet network island 204a comprises a packet network and an EN according to a device embodiment which is in the following referred to as EN2. Further, in the communication network 200, a packet network island 204b comprises a packet network and an EN according to a device embodiment which is in the following referred to as EN1. An optical network 206 with two CNs is arranged between EN1 and EN2. The optical network 206 controls an Internet Protocol (IP) based data communication network (DCN) 208. The DCN may be a Data Connection Network as defined by the International Telecommunication Union (ITU). The packet network islands 204a, 204b are connected with the optical network 206 by means of a GMPLS UNI, respectively, namely GMPLS UNI 207a and GMPLS UNI 207b. In short, in FIG. 3, an optical network 206 with two packet network islands 204a, 204b is shown. The packet network islands 204a and 204b may be part of one network, for example belong to the same client. The packet network island 204a and the packet network island 204b are separated by the optical network 206 controlling the IP based DCN 208. The interface between the packet network islands 204a, 204b and the optical network 206 is based on a GMPLS UNI, respectively. That is, the packet network island 204a is connected with the optical network 206 by means of GMPLS UNI 207a, while the packet network island 204b is connected with the optical network 206 by means of GMPLS UNI 207b. The optical network 206 can therefore be regarded as a GMPLS controlled optical network.

Figure 7:
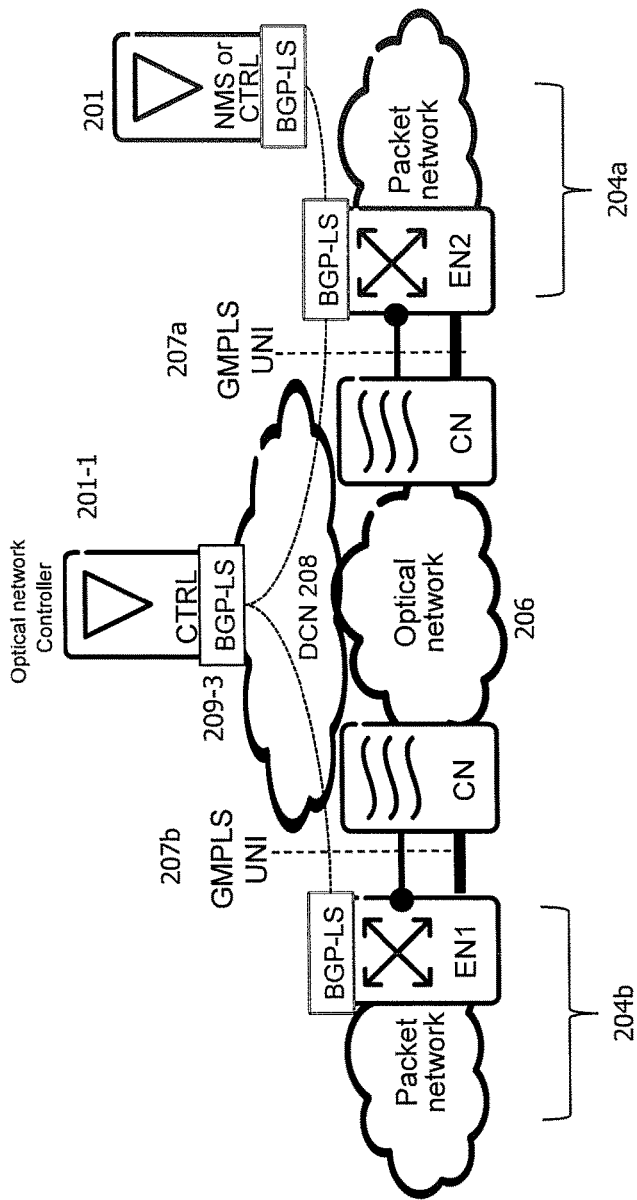
FIG. 7 schematically illustrates BGP-LS scenario with an SDN controlled optical network.

All details explained above and below with respect to the optical network with a GMPLS control plane as shown in FIG. 3, by way of example, are equally applicable to an SDN controlled optical network. Such an SDN controlled optical network is shown in FIG. 7 by way of example. In this case, a BGP-LS node 209-3 (which will be explained in more detail below with reference to FIG. 9) may be co-located with a controller in the optical network 206. In consequence, all details set forth below with respect to FIG. 3 equally apply to the SDN controlled optical network shown in FIG. 7. In accordance therewith, when referring to the NMS 201 of FIG. 3 in the following, it will be referred to the NMS or SDN controller 201.

Returning in general terms to FIG. 3, by means of the network architecture shown in FIG. 3, support of an automatic procedure may be provided for making known routing information associated with a node in a packet network island (such as packet network island 204b) to a further node located in a further packet network island (such as packet network island 204a) such that a connection establishment to the node can be initiated by the further node. The further node may be an edge node such as EN2, for example an edge router, or an NMS or SDN controller such as NMS or SDN controller 201. The node may be an edge node, for example an edge router, of the packet network island 204b, such as EN1. The edge node and the further edge node may respectively be defined as the node attached to an UNI link on the client network side corresponding to the packet network islands 204a, 204b. To this end, the involved control plane signaling may be sent "in-band" ("in-band" with respect to the optical network 206) via the DCN 208 of the optical network 206. Here, "in-band" refers to the fact that the physical links used by the DCN 208 are shared between the DCN 208 and the optical network 206, and that the DCN 208 uses a dedicated resource (such as a frequency also called lambda) that is only used for the purpose of the (optical) DCN 208. The used control plane protocol is Boarder Gateway Protocol-Link State (BGP-LS).

In the following, some details regarding the above-mentioned automatic procedure are explained with respect to FIGS. 3 to 9.

Figure 8:
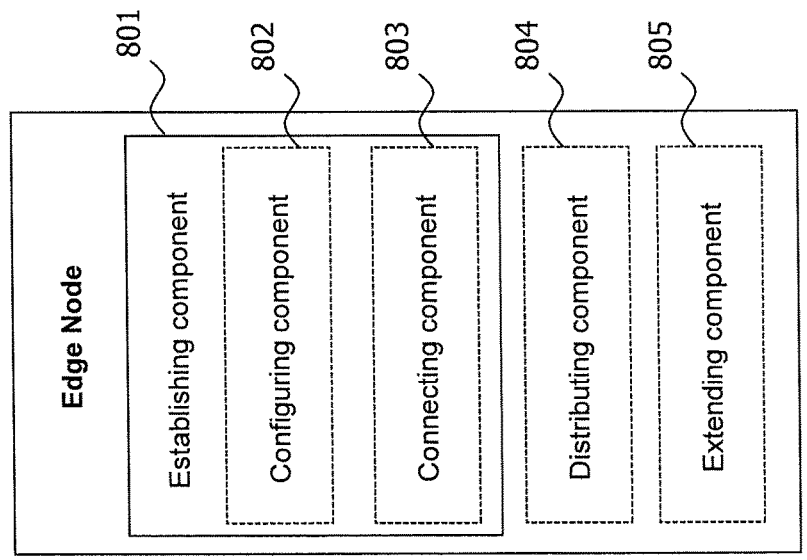
FIG. 8 schematically illustrates an embodiment of an edge node.

FIG. 8 schematically illustrates an embodiment of an edge node. The edge node of FIG. 8 may be EN2 as mentioned above. In other words, EN2 of FIG. 3 may be realized as explained with respect to the edge node of FIG. 8. Likewise, the edge node of FIG. 8 may be EN1 as mentioned above. In other words, EN1 of FIG. 3 may be realized as explained with respect to the edge node of FIG. 8.

In the following it is assumed for sake of explanation rather than limitation that the details of the edge node shown in FIG. 8 are realized in EN1. In accordance with this example, EN1 comprises an establishing component 801. The establishing component 801 is configured to establish a BGP-LS connection via the DCN with a BGP-LS node in an optical network such as BGP-LS node 209-3 of FIG. 3. The establishing component 801 may further comprise a configuring component 802 and a connecting component 803. The configuring component 802 is configured to configure the Internet Protocol (IP) address of the BGP-LS node in the optical network. The connecting component 803 is configured to connect EN1 with the BGP-LS node in the optical network via a connection provided by the DCN, when, in the BGP-LS node in the optical network, the IP address of the GMPLS UNI in EN1 is configured as the IP address of a BGP-LS neighbour.

EN1 may further comprise a distributing component 804 and an extending component 805. The distributing component 804 is configured to distribute, via the established BGP-LS connection, link Network Layer Reachability Information (NLRI). The extending component 805 is configured to extend the link NLRI to carry a reference to the IP address of the GMPLS UNI in EN1. It should be appreciated that other edge nodes, e.g. EN2, may have the same components as well as functions thereof as EN1.

Figure 9:
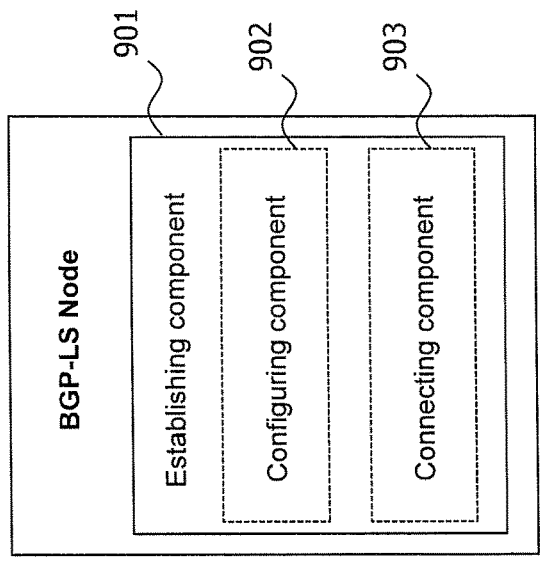
FIG. 9 schematically illustrates an embodiment of a BGP-LS node.

FIG. 9 schematically illustrates an embodiment of a BGP-LS node. The BGP-LS node of FIG. 9 may be BGP-LS node 209-3 of FIG. 3. In other words, BGP-LS node 209-3 of FIG. 3 may be realized as explained with respect to the BGP-LS node of FIG. 9.

For sake of explanation rather than limitation, the only example given in the following is that the BGP-LS node shown in FIG. 9 establishes a connection with EN1. According to this example, the BGP-LS node of FIG. 9 comprises an establishing component 901. The establishing component 901 is configured to establish a BGP-LS connection via the DCN with an edge node such as EN1. The establishing component 901 may further comprise a configuring component 902 and a connecting component 903. The configuring component 902 is configured to configure the Internet Protocol (IP) address of the GMPLS UNI in the edge node, e.g., the GMPLS UNI in EN1, as the IP address of a BGP-LS neighbour. The connecting component 903 is configured to connect the BGP-LS node in the optical network with the edge node, e.g., with EN1, via a connection provided by the DCN. It should be appreciated that the BGP-LS node can also establish BGP-LS connections with edge nodes in other packets network islands, e.g. EN2.

Figure 4:
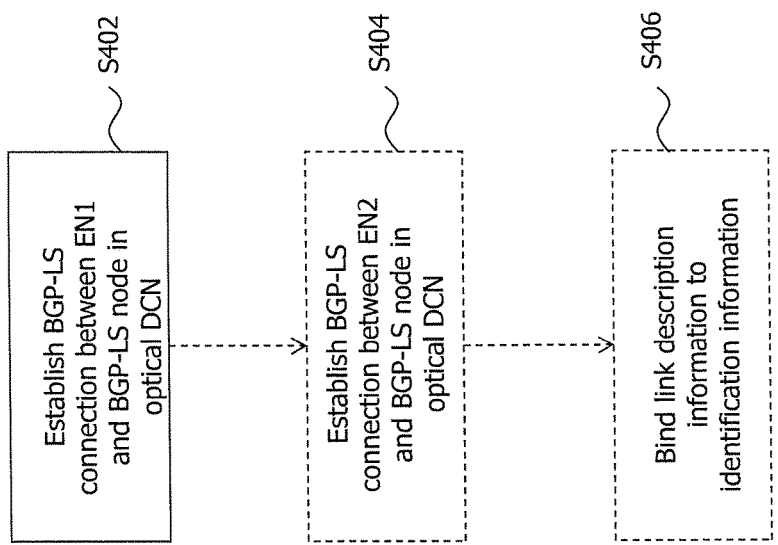
FIG. 4 schematically illustrates a method embodiment which may be performed in the network of FIG. 3.
Figure 5:
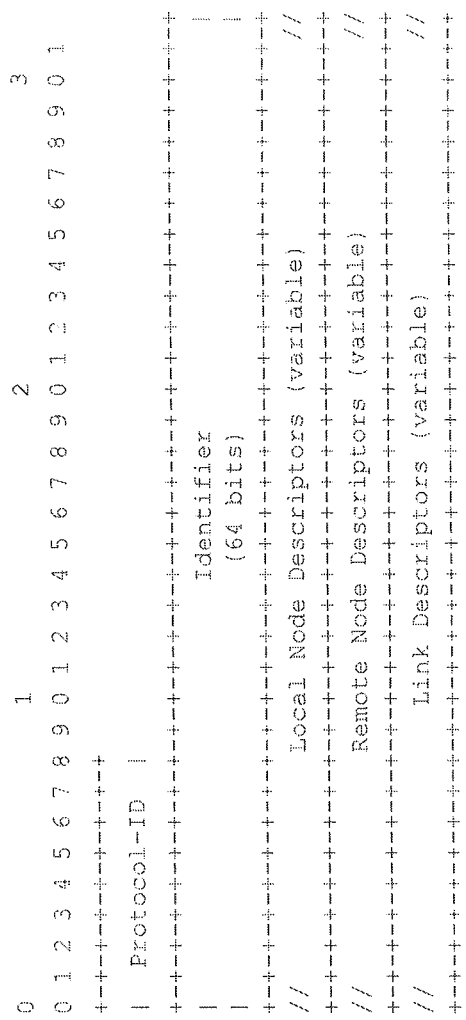
FIG. 5 illustrates format of Link NLRIs in BGP-LS.

According to a method embodiment shown in FIG. 4, EN1 establishes a BGP-LS connection to the BGP-LS node 209-3 shown in FIG. 3 (step S402). This may involve some sub-steps as will be explained below for sake of explanation rather than limitation.

By providing a GMPLS UNI, e.g. GMPLS UNI 207b, EN1 in the packet network island 204b can learn the IP address to use in order to send packets to the network side functionality of the UNI (the network side of the UNI is in the following referred to as UNI-N) in the CN (the left CN in FIG. 3). Vice versa, the CN implementing the UNI-N functionality can learn the IP address to use in order to send packets to the client side functionality of the UNI (the client or customer side of the UNI is in the following referred to as UNI-C), e.g., the IP address of EN1. The IP address of EN1 may be auto-assigned by the optical network 206 during the installation of the UNI. The UNI-C functionality may include IP addresses and IP connectivity dedicated to the GMPLS control plane. The DCN 208 of the optical network 206 serves to facilitate GMPLS signaling.

More specifically, the IP address of BGP-LS node 209-3 in the optical network 206 (more specifically, in the DCN 208 of the optical network 206) is configured in EN1. This configuration may include a configuration that an UNI link is used. In consequence, the IP address of the BGP-LS 209-3 is configured as reachable via the UNI link. For example, a BGP session is configured that supports BGP-LS Address Family Identifier/Subsequent Address Family Identifier (AFI/SAFI). The BGP-LS 209-3 may be configured to support BGP-LS AFI/SAFI. BGP-LS AFI/SAFI is an address family that includes the link NLRI. In the BGP-LS node 209-3 in the optical network 206, the IP address of the edge node EN1 is configured as the IP address of a BGP-LS neighbor. In this way, a bi-directional connection can be provided. The (optical) DCN 208 is configured to provide a routed or a bridged connection between EN1 and the BGP-LS node 209-3 in the optical network 206. Thus, a connection between EN1 and the BGP-LS node 209-3 can be configured and established. The exact implementation of the connection can be varied in dependence of the DCN technology used. For example, a Generic Routing Encapsulation (GRE) tunnel or one same IP connection may be used. According to the first option, in a routed DCN, a GRE tunnel may be set up between the left CN in FIG. 3 and the BGP-LS node 209-3 in the optical network 206. Alternatively, according to the second option, in case the BGP-LS node 209-3 is co-located with the left CN in FIG. 3, the same IP connectivity between EN1 and the left CN in FIG. 3 can be used both for GMPLS UNI signaling and BGP-LS message exchange.

Independent of the exact realization, EN1 can establish a BGP-LS connection to the BGP-LS node 209-3.

After the UNI-C is configured in EN1 and a BGP-LS connection is established between EN1 and the BGP-LS node 209-3 in the optical network 206, EN1 may start sending BGP-LS packets with link information such as link Network Layer Reachability Information (NLRI). The link NLRI may include routing information which is sent via the established connection so that it may further be distributed. The information distribution can be subject to policy configuration of the BGP-LS neighbor, i.e. the information distribution can be allowed or can be forbidden.

When EN1 distributes link information such as link NLRI on a UNI control plane link (see step S602a in FIG. 6a), e.g., from EN1 to the left CN in FIG. 3, EN1 may indicate that the link is a UNI-C link. Thus, the link NLRI may be extended to carry a reference to the UNI-C IP address, i.e., the IP address of the GMPLS UNI in EN1. For example, EN1 may encode this reference into the protocol ID field of the link NLRI. As shown in FIG. 6a, the reference may be a predefined value of the protocol ID field. In other words, the BGP-LS may set the protocol ID field to a predefined value, which can uniquely indicate that the link is a UNI-C link, e.g. 2 or 3 or any other value that could be included into the protocol ID field (see step S604a of FIG. 6a). Summarizing FIG. 6a, an EN such as EN1 is initiating a distribution of a BGP-LS link description with link NLRI corresponding to the UNI control plane link (step S602). The BGP-LS may set the protocol ID field to a predefined value (see step S604a).

The link NLRI may further comprise identification information of an edge node and link description information of the UNI link associated with the edge node. The identification information may be or comprise a Router ID. The link description information of the UNI link associated with the edge node may be or comprise an IP address of the UNI-C of the edge node. In accordance with the example shown in FIG. 5, the Router ID is included in the local node descriptors field and the link description information is included in the link descriptors field of the link NLRI. The link descriptors field may follow the format of an IPv4, IPv6 or unnumbered interface address sub-TLV.

In addition to the connection between the EN1 and the BGP-LS node 209-3, the BGP-LS node 209-3 can further establish a BGP-LS connection to EN2 (see optional step S404 in FIG. 4). The connection between EN2 and the BGP-LS node 209-3 in the optical network 206 may be configured and established similarly as the connection between EN1 and the BGP-LS node 209-3 in the optical network 206 as described above. Thus, similar procedures may be used for EN2 as for EN1. Alternatively, it is possible that the connection between EN2 and the BGP-LS node 209-3 in the optical network 206 has already been configured.

When there is an established BGP-LS connection between EN1 and the BGP-LS node 209-3 in the optical network 206 and there is a BGP-LS connection between EN2 and the BGP-LS node 209-3 in the optical network 206, BGP-LS is able to distribute BGP information from EN1 to EN2. As stated above with respect to the connection between EN1 and BGP-LS node 209-3, BGP-LS packets may comprise link information such as link Network Layer Reachability Information (NLRI). Likewise, the BGP-LS packets sent via the connection between EN2 and BGP-LS node 209-3 may comprise link information such as link Network Layer Reachability Information (NLRI).

As further stated above with respect to the connection between EN1 and BGP-LS node 209-3, routing information may be included in the link NLRI. Likewise, routing information may be included in the link NLRI sent over the connection between EN2 and BGP-LS node 209-3. The routing information may comprise identification information of EN1 (e.g., Router ID) and link description information of the UNI link associated with EN1 (IP address of the UNI-C of EN1). Further, an indication may be sent that the information is related to an UNI link. The indication may comprise or may be a reference, as explained above. For example, the identification information may be included in the local node descriptors field, the link description information may be included in the link descriptors field and the indication may correspond to a predefined value of the protocol ID field of the link NLRI of a BGP-LS message. Again, one example is illustrated in FIG. 6a.

As explained with respect to the connection between EN1 and BGP-LS node 209-3, the optical network operator may define policies for distributing information over the DCN also with reference to the connection between EN2 and BGP-LS node 209-3. For example, the optical network operator may define certain policies for distributing the BGP information. Such policies may comprise restricted packet connection where signaling transfer only by means of BGP-LS is allowed. For example, distributing the BGP information, e.g., link NLRI, over the DCN 208 may be subject to policy configuration in the BGP-LS node 209-3 in the optical network 206. In consequence, in such a restricted case, the optical network provider may allow only BGP-LS packets from the packet network islands 204a, 204b on the DCN 208 of the optical network 206 to provide support for client layer auto-configuration. In this case, the optical network provider participates in BGP-LS and BGP policies to provide the optical network operator the tool to control information distribution over the optical DCN 208.

Alternatively, according to an unrestricted case, a trusted relationship between the client and the server layers may be assumed and any form of packet connectivity may be allowed. In this case, the connection via the DCN is unrestricted. For example, EN1 and EN2 are allowed to communicate over the DCN 208 of the optical network 206 directly.

In the following, it is explained with respect to FIG. 6b how the NMS or SDN controller 201 may make use of the above mentioned method aspects.

The NMS or SDN controller 201 may be comprised in at least one of the packet network islands 204a and 204b. In the following it is assumed for explanation rather than limitation that the NMS or SDN controller 201 is in the packet network island 204a. In this case, the packet network island 204a may function as a client management system. In order to auto-discover EN1 and further setup a connection therewith after the packet network island 204b is newly connected with the optical network 206, a BGP-LS connection between EN2 and the BGP-LS node 209-3 in the optical network 206 may have already been established or may be established as explained in detail above.

Figure 6B:
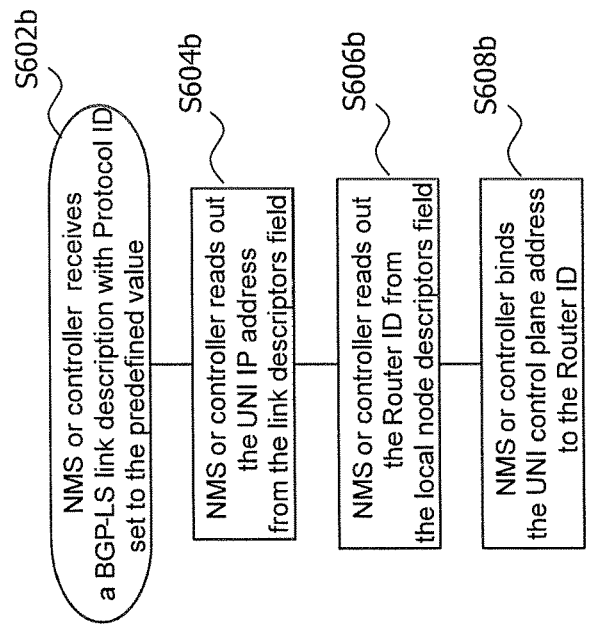
FIG. 6b is a flowchart illustrating steps performed in an NMS or SDN controller.
Figure 6A:
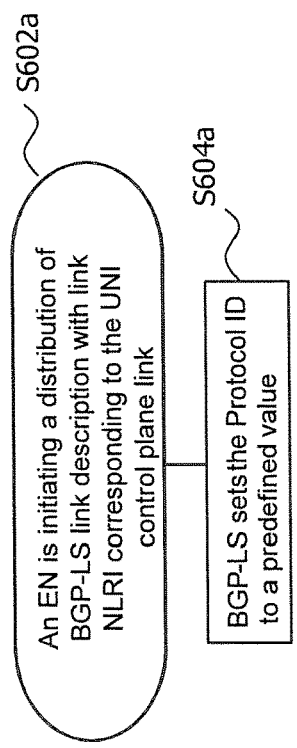
FIG. 6a is a flowchart illustrating a BGP-LS extension method in edge nodes.

In accordance with the example shown in FIG. 6b, the NMS or SDN controller 201 receives a link NRLI regarding EN1 (see step S602b of FIG. 6b). In accordance with the example of FIG. 6a a predefined value of the protocol ID field of the link NLRI of a BGP-LS message is set to a specific value as explained above. The NMS or SDN controller 201 reads out the UNI IP address from the link descriptors field of the link NLRI (see step S604b of FIG. 6b). Further, the NMS or SDN controller 201 reads out the Router ID from the local node descriptors field of the link NLRI (see step S606b of FIG. 6b). In this way, the NMS or SDN controller 201 is able to determine if it has received a link description with a UNI-C IP address because of the reference in the link NLRI and, if positive, can bind the UNI-C IP address to the edge node having the Router ID (see step S608b in FIG. 6b). In other words, upon receipt of this information, the NMS or SDN controller 201 binds the link description information (UNI-C IP address) to the identification information (Router ID). Thus, the NMS or SDN controller 201 has all data available to decide if it needs to set up an optical connection to the new edge node, i.e., EN1. In addition, the NMS or SDN controller 201 may store the binding of the IP address and the Router ID comprised in the link NRLI. Alternatively, the above-mentioned functions of the NMS or SDN controller 201 can be assumed or realized by EN2.

In one example, the further node (EN2 or NMS or SDN controller 201) may auto-learn the routing information (UNI-C IP address) given to the node (EN1) by the optical network 206 during installation of the node (EN1) upon receipt of the routing information via the BGP-LS connection. Such auto-learning procedures are known to the skilled person. The further node (EN2 or NMS or SDN controller 201) is then enabled to establish an out-of-band optical connection via the optical network. "Out-of-band" refers to the perspective of the packet network, since the packet network's service traffic uses the resource (such as a frequency called lambda) established between the node (EN1) and the further node (EN2 or NMS or SDN controller 201). Therefore, nodes already activated and nodes which activate later after the configuration of the GMPLS interface of the optical network 206 can be reached by the further node (EN2 or NMS or SDN controller 201). When the EN2 or the packet NMS or SDN auto-learns the routing information (the UNI-C IP address given to EN1 by the optical network during installation of EN1) further advantages can be achieved. Auto-learning enables the EN2 or the NMS or SDN controller 201 to recognize the identity and UNI-C IP address of EN1 when it is installed.

As has become apparent from above description of exemplary embodiments, nodes are enabled to establish an "in-band" optical connection via the optical network. There is no need to permanently maintain the DCN. Since there is no need to permanently maintain the DCN, cost reduction can be achieved by saving operating expenses (OPEX). Nodes already activated and nodes which activate later after the configuration of the GMPLS interface of the optical network can be easily reached by nodes on the other side of the optical network. In consequence, a technique is provided for setting up an optical connection between a local node and a remote node. Similarly, a technique is provided for setting up an optical connection between a local packet network island node and a remote packet network island (node).

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting provision of a connection, via a data communication network (DCN) of an optical network, between a first packet network island and a second packet network island, the method comprising:
   establishing a Border Gateway Protocol-Link State (BGP-LS) connection, via the DCN, between a first edge node of the first packet network island and a BGP-LS node in the optical network,
   wherein establishing the BGP-LS connection, via the DCN, between the first edge node of the first packet network island and the BGP-LS node in the optical network comprises:
   configuring, in the first edge node, an Internet Protocol (IP) address of the BGP-LS node in the optical network;
   configuring, in the BGP-LS node in the optical network, the IP address of the GMPLS UNI in the first edge node as the IP address of a BGP-LS neighbor; and
   providing, by the DCN, a connection between the first edge node and the BGP-LS node in the optical network,
   wherein the first packet network island and the second packet network island are connected with the optical network by means of a Generalized Multiprotocol Label Switching User-to-Network Interface (GMPLS UNI), respectively.

2. The method of claim 1, further comprising establishing a BGP-LS connection via the DCN between a second edge node of the second packet network island and the BGP-LS node in the optical network.

3. The method of claim 1, wherein, in case of a routed DCN, the connection provided by the DCN is based on a Generic Routing Encapsulation tunnel.

4. The method of claim 1, wherein the BGP-LS node is co-located with a core node or a controller in the optical network.

5. The method of claim 2, further comprising distributing, via the established BGP-LS connection, link Network Layer Reachability Information (NLRI).

6. The method of claim 5, wherein distributing the link NLRI is subject to policy configuration in the BGP-LS node in the optical network.

7. The method of claim 5, wherein each link NLRI comprises router identification of one of the first and second edge nodes in a local node descriptors field.

8. The method of claim 7:
   wherein the first packet network island and the second packet network island are connected with the optical network by means of a Generalized Multiprotocol Label Switching User-to-Network Interface (GMPLS UNI), respectively;
   wherein the link NLRI further comprises Internet Protocol (IP) address of the GMPLS UNI in the one of the first and second edge node in a link descriptors field.

9. The method of claim 8, wherein the distributing comprises extending the link NLRI to carry a reference to the IP address of the GMPLS UNI in the one of the first and second edge node.

10. The method of claim 9, wherein the reference is a predetermined value in a protocol ID field of the link NLRI.

11. The method of claim 10:
    wherein at least one of the first and second packet network islands comprises a Network Management System (NMS) or Service-Defined-Networking (SDN) controller;
    wherein the NMS or SDN controller is configured to recognize a predetermined value and bind the IP address to a router ID comprised in the link NLRI.

12. The method of claim 11, wherein the NMS or SDN controller is configured to store the binding of the IP address and a router ID comprised in the link NLRI.

13. The method of claim 1:
    wherein the method is performed in an edge node in one of the two packet network islands;
    wherein the establishing comprises establishing the BGP-LS connection via the DCN with a BGP-LS node in the optical network.

14. The method of claim 1:
    wherein the method is performed in a BGP-LS node in the optical network;
    wherein the establishing comprises establishing the BGP-LS connection via the DCN with an edge node in at least one of the two packet network islands.

15. A non-transitory computer readable recording medium storing a computer program product for supporting provision of a connection, via a data communication network (DCN) of an optical network, between a first packet network island and a second packet network island, the computer program product comprising software instructions which, when run on processing circuitry of a computing device, causes the computing device to:
    establish a Border Gateway Protocol-Link State (BGP-LS) connection, via the DCN, between a first edge node of the first packet network island and a BGP-LS node in the optical network, wherein the BGP-LS connection is established by:

configuring, in the first edge node, an Internet Protocol (IP) address of the BGP-LS node in the optical network;

configuring, in the BGP-LS node in the optical network, the IP address of the GMPLS UNI in the first edge node as the IP address of a BGP-LS neighbor; and providing, by the DCN, a connection between the first edge node and the BGP-LS node in the optical network, wherein the first packet network island and the second packet network island are connected with the optical network by means of a Generalized Multiprotocol Label Switching User-to-Network Interface (GMPLS UNI), respectively.

16. An edge node for supporting provision of a connection, via a data communication network (DCN) of an optical network, between two packet network islands, the edge node comprising:

processing circuitry;

memory containing instructions executable by the processing circuitry whereby the edge node is operative to:

establish a Border Gateway Protocol-Link State (BGP-LS) connection, via the DCN, with a BGP-LS node in the optical network, wherein each of the two packet network islands is connected with the optical network by means of a Generalized Multiprotocol Label Switching User-to-Network Interface (GMPLS UNI), wherein the instructions are such that the edge node is operative to:

configure an Internet Protocol (IP) address of the BGP-LS node in the optical network; and connect the edge node with the BGP-LS node in the optical network, via a connection provided by the DCN, when, in the BGP-LS node in the optical network, the IP address of the GMPLS UNI in the edge node is configured as the IP address of a BGP-LS neighbor.

17. The edge node of claim 16, wherein the edge node is in at least one of the two packet network islands.

18. The edge node of claim 16, wherein in case of a routed DCN, the connection provided by the DCN is based on a Generic Routing Encapsulation tunnel.

19. The edge node of claim 16, wherein the instructions are such that the edge node is operative to distribute, via the established BGP-LS connection, link Network Layer Reachability Information (NLRI).

20. The edge node of claim 19, wherein distributing the link NLRI is subject to policy configuration in the BGP-LS node in the optical network.

21. The edge node of claim 19, wherein the link NLRI comprises router ID of the edge node in the local node descriptors field.

22. The edge node of claim 21:

wherein each of the two packet network islands is connected with the optical network by means of a Generalized Multiprotocol Label Switching User-to-Network Interface (GMPLS UNI);

wherein the link NLRI further comprises the IP address of the GMPLS UNI in the edge node in the link descriptors field.

23. The edge node of claim 22, wherein the instructions are such that the edge node is operative to extend the link NLRI to carry a reference to the IP address of the GMPLS UNI in the edge node.

24. The edge node of claim 23, wherein the reference is a predetermined value in a protocol ID field of the link NLRI.

25. A Border Gateway Protocol-Link State (BGP-LS) node in an optical network for supporting provision of a connection, via a data communication network (DCN) of an optical network, between two packet network islands, the BGP-LS node comprising:

processing circuitry;

memory containing instructions executable by the processing circuitry whereby the BGP-LS mode is operative to establish a Border Gateway Protocol-Link State (BGP-LS) connection via the DCN with an edge node, wherein the BGP-LS connection is established by:

configuring, in the first edge node, an Internet Protocol (IP) address of the BGP-LS node in the optical network;

configuring, in the BGP-LS node in the optical network, the IP address of the GMPLS UNI in the first edge node as the IP address of a BGP-LS neighbor; and providing, by the DCN, a connection between the first edge node and the BGP-LS node in the optical network, wherein each of the two packet network islands is connected with the optical network by means of a Generalized Multiprotocol Label Switching User-to-Network Interface (GMPLS UNI).

26. The BGP-LS node of claim 25, wherein the edge node is in at least one of the two packet network islands.

27. The BGP-LS node of claim 25, wherein the instructions are such that the BGP-LS node is operative to:

configure an Internet Protocol (IP) address of a Generalized Multiprotocol Label Switching User-to-Network Interface (GMPLS UNI) in the edge node as the IP address of a BGP-LS neighbor; and connect the BGP-LS node with the edge node via a connection provided by the DCN.

* * * * *